United States Patent
Heung et al.

(10) Patent No.: US 10,496,191 B2
(45) Date of Patent: Dec. 3, 2019

(54) INPUT DEVICE

(71) Applicant: Kwei Hing Heung, Hong Kong (CN)

(72) Inventors: Kwei Hing Heung, Hong Kong (CN); Elton Yu Man Leung, Hong Kong (CN)

(73) Assignee: GREENBULB TRADING LIMITED, Kowloon, Hong Kong (CN)

( * ) Notice: Subject to any disclaimer, the term of this patent is extended or adjusted under 35 U.S.C. 154(b) by 0 days.

(21) Appl. No.: 15/558,875

(22) PCT Filed: Apr. 21, 2015

(86) PCT No.: PCT/CN2015/077119
§ 371 (c)(1),
(2) Date: Sep. 15, 2017

(87) PCT Pub. No.: WO2016/168990
PCT Pub. Date: Oct. 27, 2016

(65) Prior Publication Data
US 2018/0067569 A1    Mar. 8, 2018

(51) Int. Cl.
*G06F 3/0354*    (2013.01)
*G06F 3/041*    (2006.01)
*G06F 3/0488*    (2013.01)
*G06F 3/045*    (2006.01)

(52) U.S. Cl.
CPC ........ *G06F 3/03545* (2013.01); *G06F 3/0416* (2013.01); *G06F 3/04883* (2013.01); *G06F 3/045* (2013.01); *G06F 3/0414* (2013.01)

(58) Field of Classification Search
None
See application file for complete search history.

(56) References Cited

U.S. PATENT DOCUMENTS

| | | | |
|---|---|---|---|
| 9,250,720 B2 * | 2/2016 | George | G06F 3/0414 |
| 2011/0169756 A1 | 7/2011 | Ogawa | |
| 2011/0304577 A1 * | 12/2011 | Brown | G06F 3/03545 |
| | | | 345/174 |

FOREIGN PATENT DOCUMENTS

| | | |
|---|---|---|
| CN | 101727218 A | 6/2010 |
| CN | 202720602 | 2/2013 |
| JP | 07-041629 | 7/1995 |

(Continued)

OTHER PUBLICATIONS

International Search Report for PCT/CN2015/077119, dated Jan. 18, 2016.

(Continued)

*Primary Examiner* — Kenneth B Lee, Jr.
(74) *Attorney, Agent, or Firm* — Ladas & Parry, LLP; Melvin Li

(57) ABSTRACT

There is provided an electronic stylus. The stylus has, for example, an elongate member defining a utility portion for effecting input on or otherwise contacting a touchscreen of a computing device, a handle portion adapted to fit the grip of a user in use, and a cable for electrically connecting the computing device and the elongate member. The cable is adapted to transmit a first signal from the computing device to the stylus and then to transmit a second signal from the stylus to the computing device via the cable, the second signal modulated from the first signal and not generated from within the stylus.

17 Claims, 14 Drawing Sheets

(56) References Cited

FOREIGN PATENT DOCUMENTS

JP  2011-145763  7/2011

OTHER PUBLICATIONS

Written Opinion of the International Search Authority for PCT/CN2015/077119, dated Jan. 18, 2016.
PCT International Preliminary Report on Patentability (Chapter I) with Written Opinion from PCT/CN2015/077119 dated Oct. 24, 2017.

* cited by examiner

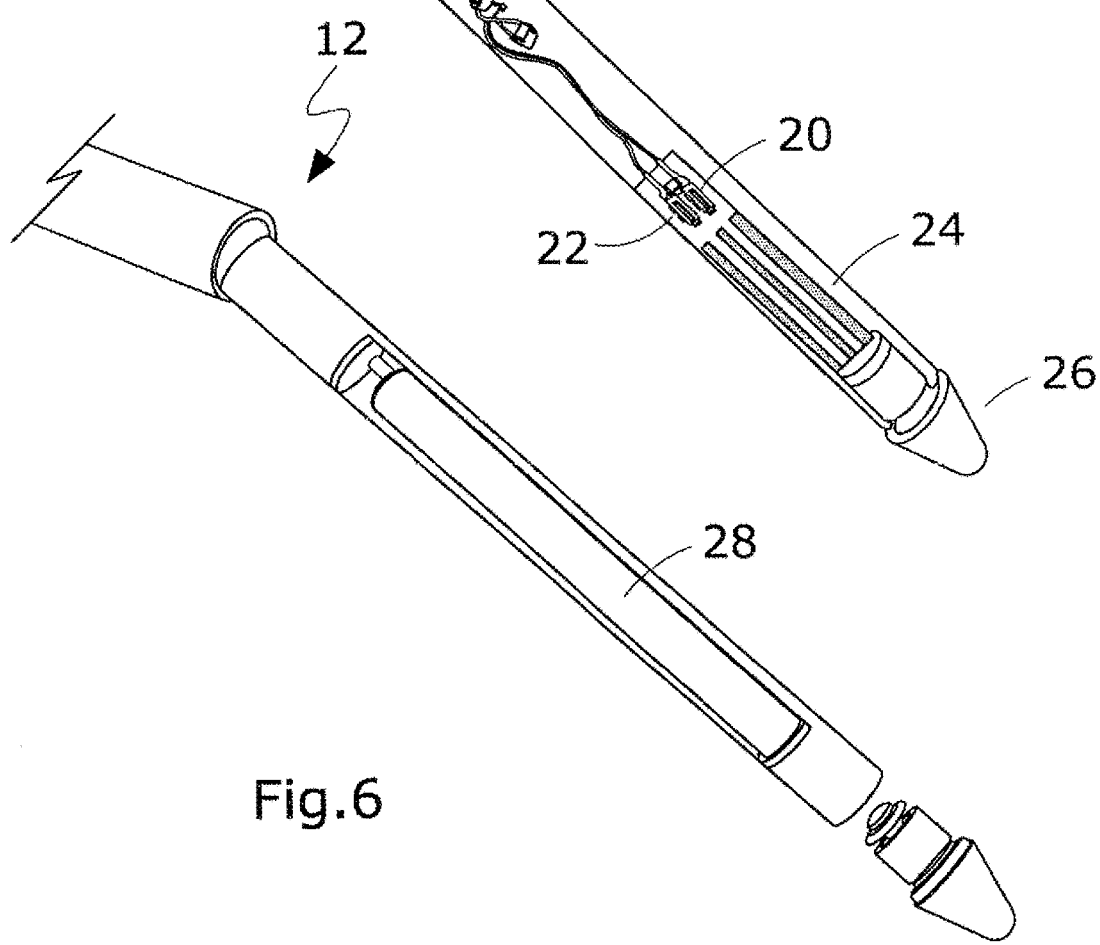

INPUT DEVICE

CROSS-REFERENCE TO RELATED APPLICATION

The present application is the U.S. national phase of PCT Application No. PCT/CN2015/077119 filed on Apr. 21, 2015, the disclosure of which is incorporated herein by reference in its entirety.

FIELD OF THE INVENTION

The present invention is concerned with an improved input device for use with a computing device, and specifically for use when interacting with a touch screen of the computing device. The present invention is also concerned with a system comprising such a computing device and an input device, and a computer program for use with the computing device.

BACKGROUND OF THE INVENTION

Electronic devices equipped with a touchscreen through which a user can input data have become increasingly popular. One common problem however is that inputting information accurately to such devices can be difficult. Various problems often arise. For example, the touch screen may be too small, virtual buttons or switches on the touchscreen may be too difficult for some users to activate, etc.

Due to these problems, instead of using user fingers there have been proposals to use a pen-like object or stylus as an input device. While such pen-like object is effective to some extent because they typically have a finer nib, they are often unable to produce writing effects with higher sophistication. For example, they are often unable to produce results resembling traditional hand drawings or calligraphy. In some instances, some of these pen-like objects might be able to achieve limited writing effects but at the expense of too high in complexity in their design and operation.

The present invention seeks to address the above described problems or at least to provide an alternative to the public.

SUMMARY OF THE INVENTION

According to a first aspect of the present invention, there is provided an electronic stylus comprising a utility portion for effecting input on or otherwise contacting a touchscreen of a computing device, a handle portion adapted to fit the grip of a user in use, and a cable for electrically connecting the computing device and the elongate member, the cable adapted to transmit a first signal from the computing device to the stylus and then to transmit a second signal from the stylus to the computing device via the cable, the second signal modulated from the first signal and not generated from within the stylus, wherein the cable is provided with a jack for connection to an audio input/output port of the computing device, the utility portion of the stylus is adapted to effect a stroke with varying width along a length of the stroke or a selection on the touchscreen, the width of the stroke at a particular longitudinal location of the stroke or the selection on the touchscreen corresponds with magnitude of downward pressure exerted by the user on the touchscreen via the utility portion, and the stylus is free of means for the stylus to wirelessly communicate with the computing device.

Preferably, the cable may be adapted to transmit, in a first instance, the first signal across a member with a default voltage, then, in a second instance, transmit the second signal across the member with a voltage modulated from the default voltage, difference of the modulated voltage and the default voltage corresponds with the magnitude of downward pressure. The utility portion may include a floating member for engagement with the touchscreen and a signal modulator for modulating the first signal to become the second signal. The modulator may be configured to, in response to change in pressure exerted thereon, modulate resistance thereof, and then in turn modulate electrical current passing therethrough. The modulator may be a force-sensing resistor. The force-sensing resistor may have two sets of fingers inter-digitally arranged. The jack of the cable may have a mic section, a ground section, a left audio section and a right audio section. The jack may be connected to a first contact pin and a second contact pin.

In an embodiment, the utility portion may be configured such that the right audio section or left audio section of the connector is electrically connectable to the audio input/output port of the computing device at one end and connected with the first contact pin at an opposite end, and wherein the second pin is electrically connected to the ground section. The audio right or left section, the first contact pin, the resistor, the second pin and the ground section may be arranged in series. The utility portion may be adapted to assume a first configuration or a second configuration in which in the first configuration no pressure is exerted on the floating member and potential difference between the ground section and the mic section is not changed, whereby in operation the second signal is not modulated or is otherwise identical to the first signal. Alternatively, in the second configuration in which pressure is exerted on the floating member and potential difference between the ground section and the mic section is changed, whereby the second signal is modulated from the first signal, and wherein change in the width of the stroke effected corresponds to the magnitude of downward pressure exerted by the user on the touchscreen via the utility portion.

In one embodiment, the utility portion may configured such that the right audio section or left audio section of the connector is electrically connectable to the audio input/output port of the computing device at one end and connected with the first contact pin at an opposite end, and wherein the second pin is electrically connected to the mic section. The audio right or left section, the first contact pin, the resistor, the second pin and the mic section may be arranged in series. The utility portion may be adapted to assume a first configuration or a second configuration, in which in the first configuration no pressure is exerted on the floating member and potential difference between the ground section and the mic section is not changed, whereby in operation the second signal is not modulated or is otherwise identical to the first signal. Alternatively, in the second configuration in which pressure is exerted on the floating member and potential difference between the ground section and the mic section is changed, whereby in operation the second signal is modulated from the first signal, and wherein change in the width of the stroke effected corresponds to the magnitude of downward pressure exerted by the user on the touchscreen via the utility portion.

According to a second aspect of the invention, there is provided an electronic stylus comprising a utility portion for effecting input on or otherwise contacting a touchscreen of a computing device, a handle portion adapted to fit the grip of a user in use, and a cable for electrically connecting the computing device and the elongate member, the cable adapted to transmit a first signal from the computing device to the stylus and then to transmit a second signal from the stylus to the computing device via the cable, the second signal modulated from the first signal and not generated from within the stylus, wherein the cable may be provided with a jack for connection to an audio input/output port of the computing device, and the utility portion of the stylus is adapted to effect a stroke with varying width along a length of the stroke or a registration on the touchscreen, the width of the stroke at a particular longitudinal location of the stroke or the selection corresponds with magnitude of downward pressure exerted by the user on the touchscreen via the utility portion.

According to a third aspect of the present invention, there is provided a combination of an electronic device with a touchscreen and an electronic stylus including a utility portion for effecting input on or otherwise contacting the touchscreen, a handle portion adapted to fit the grip of a user in use, and a cable for electrically connecting to the electronic device and the elongate member, the cable adapted to transmit a first signal from the electronic device to the stylus and then to transmit a second signal from the stylus to the electronic device via the cable, the second signal modulated from the first signal and not generated from within the stylus, wherein the cable is provided with a jack for connection to a conventional audio input/output port of the electronic device, the utility portion of the stylus is capable to effect a stroke with varying width along a length of the stroke or a registration on the touchscreen, the width of the stroke at a particular longitudinal location of the stroke or the selection corresponds with magnitude of downward pressure exerted by the user on the touchscreen via the utility portion, and the stylus is free of means for the stylus to wirelessly communicate with the computing device.

According to a fourth aspect of the present invention, there is provided an input system comprising an electronic device with a touchscreen, an electronic stylus, and a computer program loaded in the electronic device, wherein:
- the stylus includes a utility portion for effecting input on or otherwise contacting the touchscreen, a handle portion adapted to fit the grip of a user in use, and a cable for electrically connecting to the electronic device and the elongate member, the cable adapted to transmit a first signal from the electronic device to the stylus and then to transmit a second signal from the stylus to the electronic device via the cable, the second signal modulated from the first signal and not generated from within the stylus;
- the cable is provided with a jack for connection to an audio input/output port of the electronic device;
- the utility portion of the stylus is capable to effect a stroke with varying width along a length of the stroke or a registration on the touchscreen, the width of the stroke at a particular longitudinal location of the stroke or the selection corresponds with magnitude of downward pressure exerted by the user on the touchscreen via the utility portion;
- the stylus is free of means for the stylus to wirelessly communicate with the computing device; and
- the computer program is configured to produce a value corresponding to a differential of i) a detected potential difference between a right or left audio section and a ground or mic section of the cable and ii) a potential difference between ground and mic sections of the cable, whereby the computing device in response to the differential value produces a stroke with a width in commensuration with the differential value.

BRIEF DESCRIPTION OF THE DRAWINGS

Some embodiments of the present invention will now be explained, with reference to the accompanied drawings, in which:—

FIG. 5 shows a side view of a utility portion of the stylus of FIG. 4;

FIG. 6 shows an opposite side view of the stylus of FIG. 5;

DETAILED DESCRIPTION OF PREFERRED EMBODIMENTS OF THE INVENTION

Figure 1:
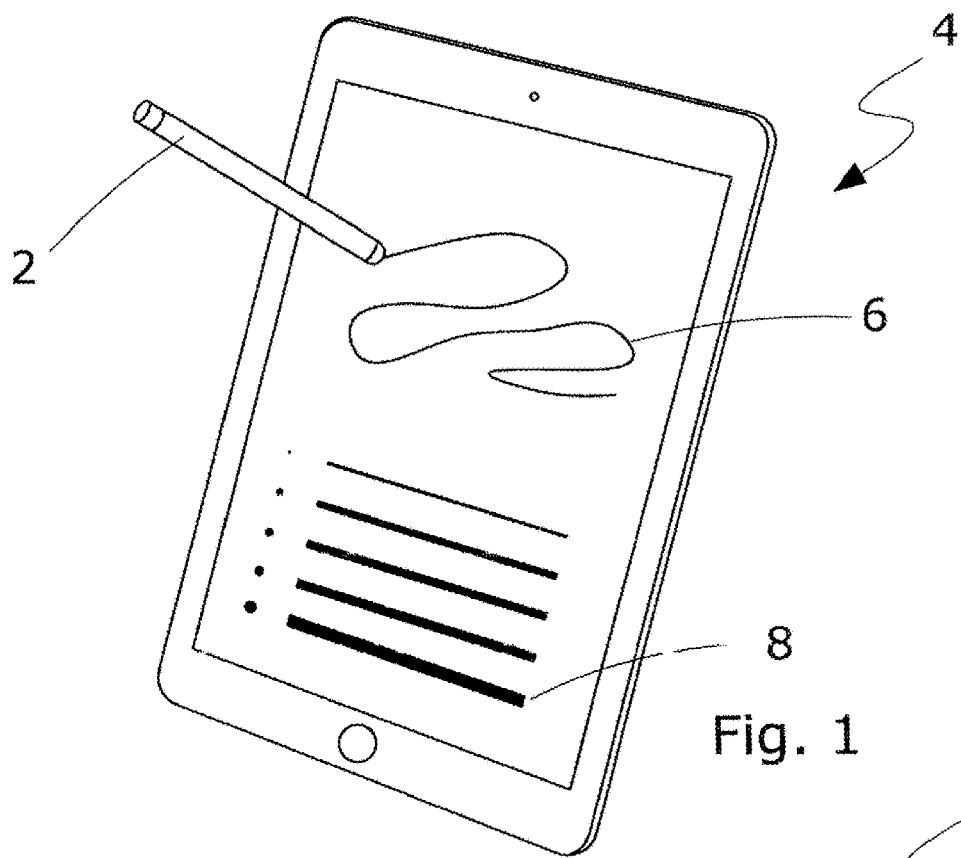
FIG. 1 and FIG. 2 are schematic diagrams showing a conventional tablet equipped with a stylus for assisting input of data.
Figure 2:
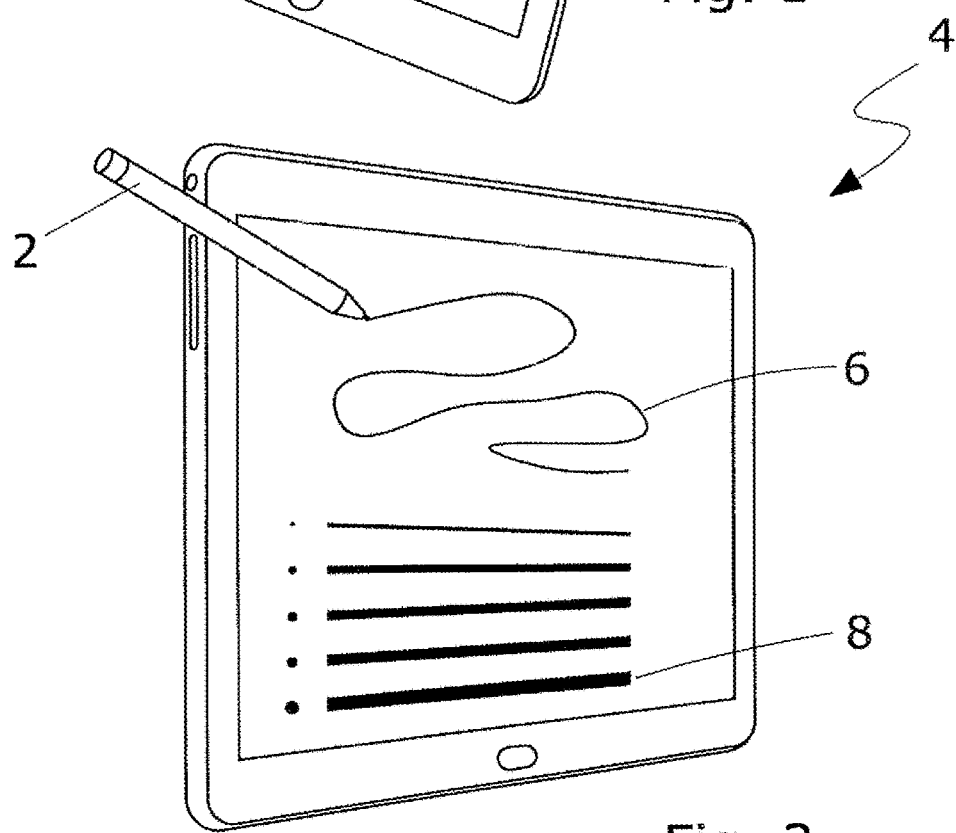

FIG. 1 and FIG. 2 are schematic diagrams illustrating a conventional stylus 2 for use with a tablet 4. With the use of the stylus 2, a user would be able to drawing a line 6 although the line across its length would have a fixed width. If the user would like to draw a line with a different thickness, s/he would need to switch the tablet 4 to a different mode associated with a line (e.g. line 8) with a different width thus allowing the stylus 2 to draw a line with the different width. It can thus be envisaged that it would be impossible to draw a line continuously with varying width by using the stylus 2. In other words, it would be impossible to use the stylus to make drawings or write calligraphy with sophistication because complicated figures or calligraphy almost always requires making out continuous lines with varying width.

Figures 3, 4:
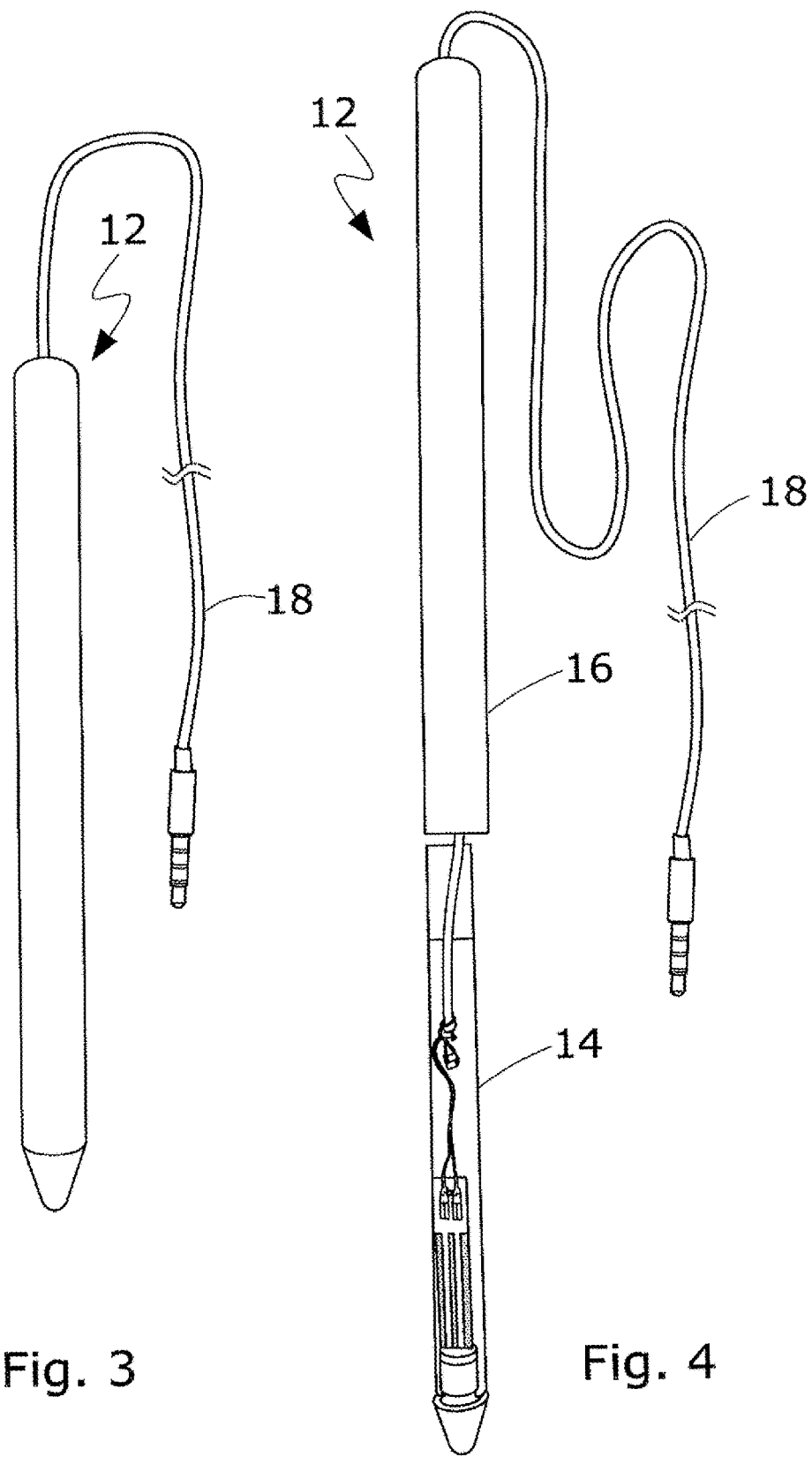
FIG. 3 is schematic diagram showing an embodiment of a stylus according to the present invention.
FIG. 4 shows the stylus of FIG. 3 but with interior construction therein exposed.

FIG. 3 is a schematic view of an embodiment of a stylus according to the present invention. The stylus, designated 12, generally has an inner or utility portion 14, an outer portion 16 is generally in the form of a cylindrical housing in which the inner portion 14 resides and an electrical cable 18 extending from a rear end of the stylus 12.

FIG. 4 is an exploded view showing the inner portion of the stylus 12. FIG. 5 is an enlarged view showing a front of the stylus 12 of FIG. 4. It is shown that one end of the cable 18 folks off and extends to a first connecting pin 20 and a second connecting pin 22 arranged at a lower portion of the stylus 12. Further towards the lower portion of the stylus 12 is provided with a signal modulator 24 and a nib 26 forming a tip of the stylus 12.

FIG. 6 corresponds to FIG. 5 showing a rear of the stylus 12. In this figure, it is shown that the stylus 12 is provided with an elongate member 28 extending along the longitudinal length of the stylus 12. In this embodiment, this elongate member 28 has a cylindrical profile and is used as a weight member to provide appropriate weight to the stylus 12.

Figure 7:
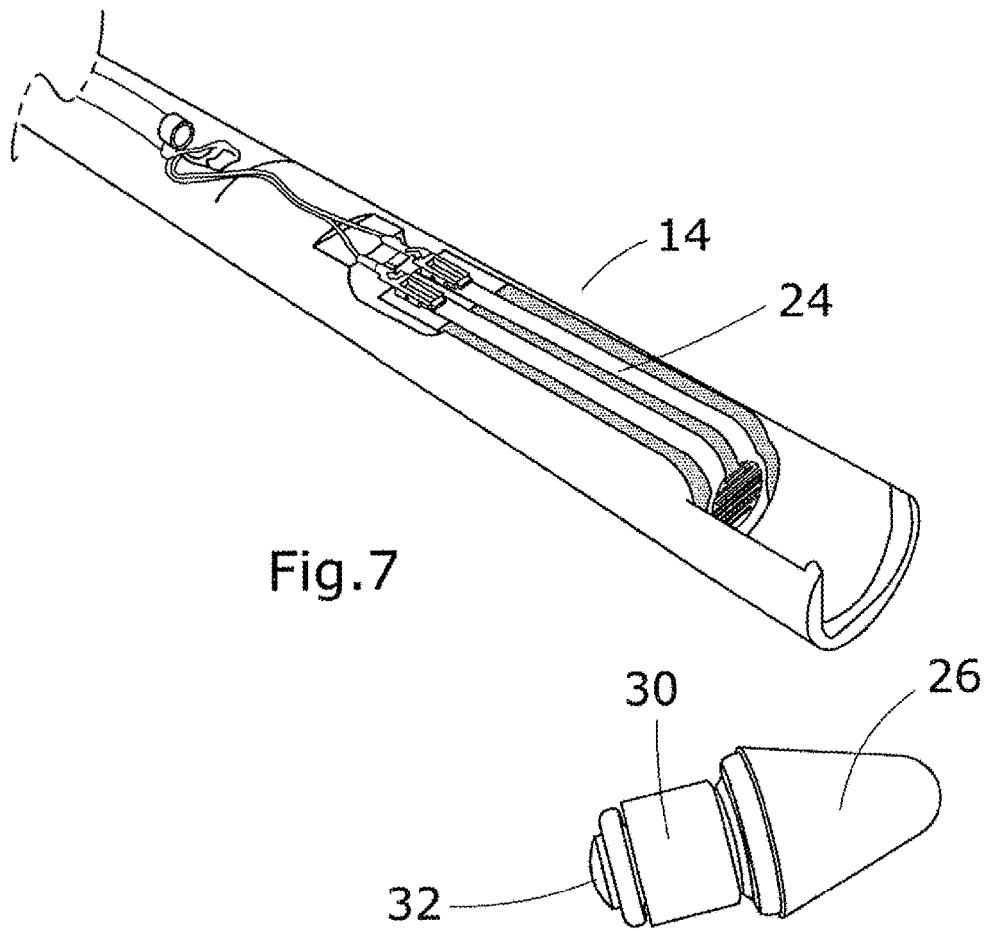
FIG. 7 corresponds to FIG. 8 but a tip portion of the stylus is detached from the utility portion.
Figure 8:
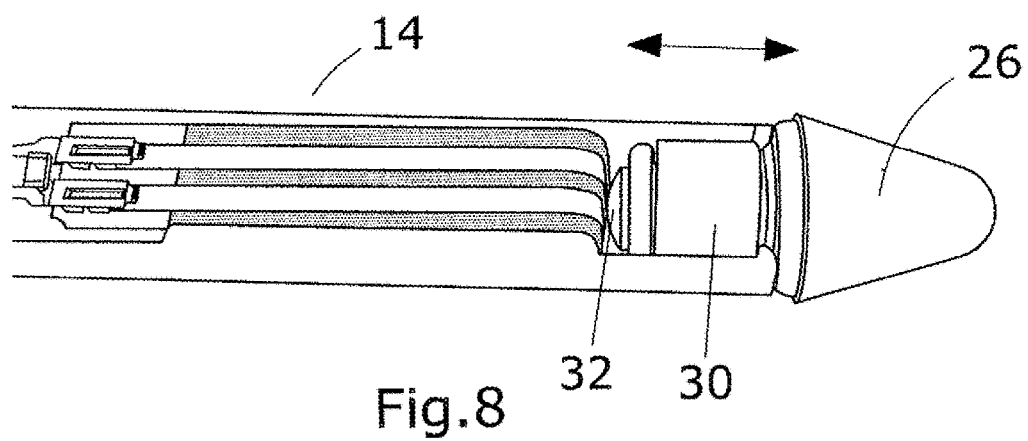
FIG. 8 generally is an enlarged view of the stylus of FIG. 5.

FIG. 6, FIG. 7 and FIG. 8 more clearly show the configuration of the nib 26. The nib 26 has a conical configuration with a narrower lower end for contact with a touch screen of, for example, a tablet or other handheld digital device. The nib 26 has an upper end 32 provided with a flange 30 at which the nib 26 is secured to the utility portion 14 of the stylus 12. The nib 26 includes an elongate member with enlarged ends on opposite ends thereof. One end or the lower end (not shown in the figures) of the elongate member is embedded in the narrower end of the nib 26. The opposite ends of the elongate member is connected to or is part of the upper end 12. When the nib 26 is secured to the stylus and in use when a user exerts pressure on the stylus thus causing the nib 26 to press against a touchscreen surface, the nib deforms slightly and reaction to the nib actuates on the lower end of the elongate member in the nib. The elongate member is thus caused to move upward towards the force sensing resistor. Please see arrows in FIG. 8. Depending on the magnitude of downward pressure exerted on the stylus 12 in use, the nib 26 and thus also the elongate member move correspondingly closer towards the utility portion 14. FIG. 7 and FIG. 8 more clearly show the connection of the nib 26 with the signal modulator 24. FIG. 7 shows the nib 26 detached from the utility portion 14 and FIG. 8 shows the nib 26 installed with the utility portion 14. The upper end 32 of the nib 26 has a convex profile and engages with the signal modulator 24. It can thus be understood that in use when downward pressure is exerted on the stylus 12, the nib 26 moves closer to the signal modulator 24 and thus the upper portion 32 of the nib 26 presses harder on the signal modulator 24.

Figure 9:
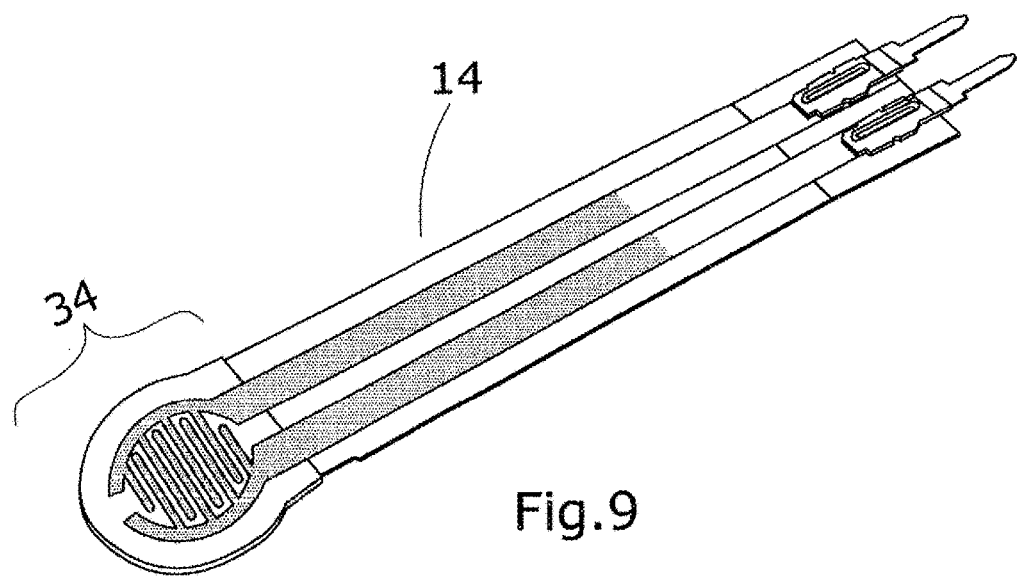
FIG. 9 is a schematic diagram showing electronics residing in the stylus of FIG. 3.
Figure 10:
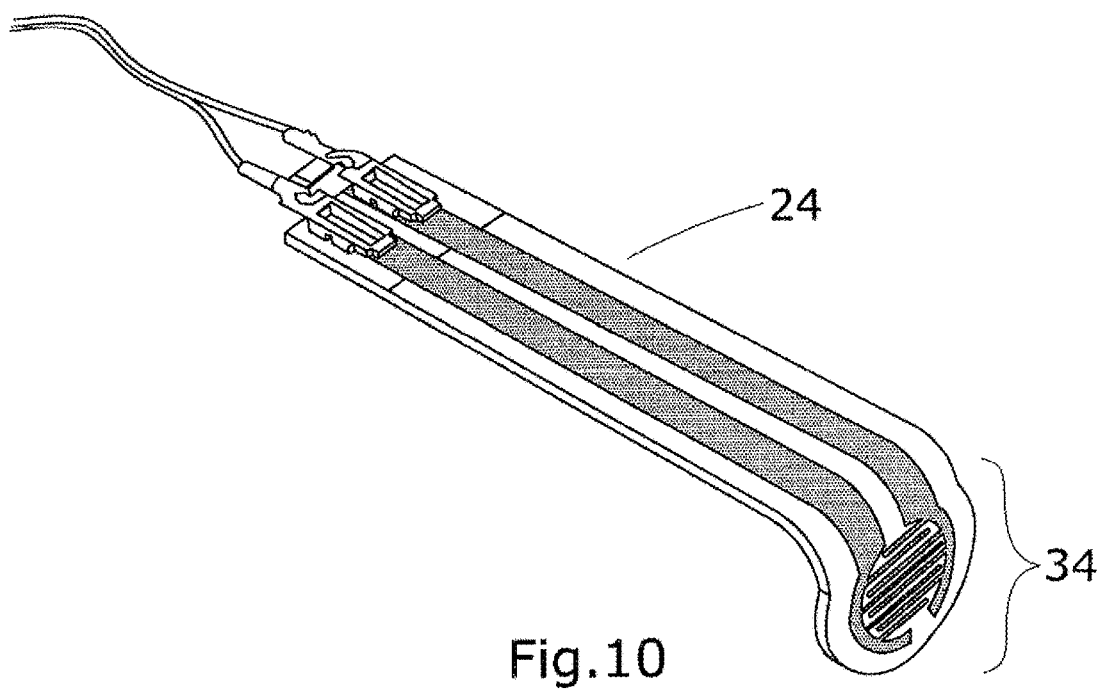
FIG. 10 generally corresponds to FIG. 9 but also showing electrical connection to the electronics.

FIG. 9 is a perspective view of the signal modulator 24 and FIG. 10 shows the signal modular 24 connected to the electrical cable 18. The signal modular 24 includes a force sensing resistor 34. In this embodiment, the resistor 34 assumes a circular and thin profile. The resistor 34 is bent at substantially 90° with respect to the rest of the signal modulator 24. Please see FIG. 10. It is the resistor 34 of the signal modulator 24 at which the upper portion 32 to the nib 26 engages. The signal modulator 24 is configured such that incoming signal is modulated depending on the magnitude of pressure or force exerted on the resistor 34.

Figure 11:
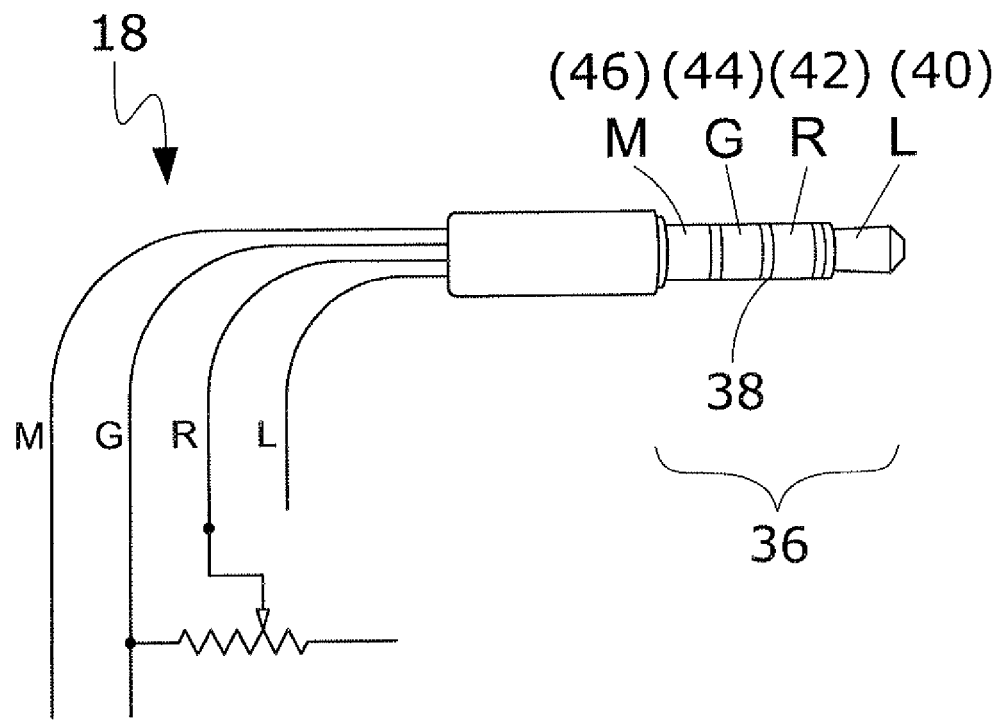
FIG. 11 is a schematic diagram illustrating, in one embodiment, circuit configuration of the electronics of FIG. 10.
Figure 12:
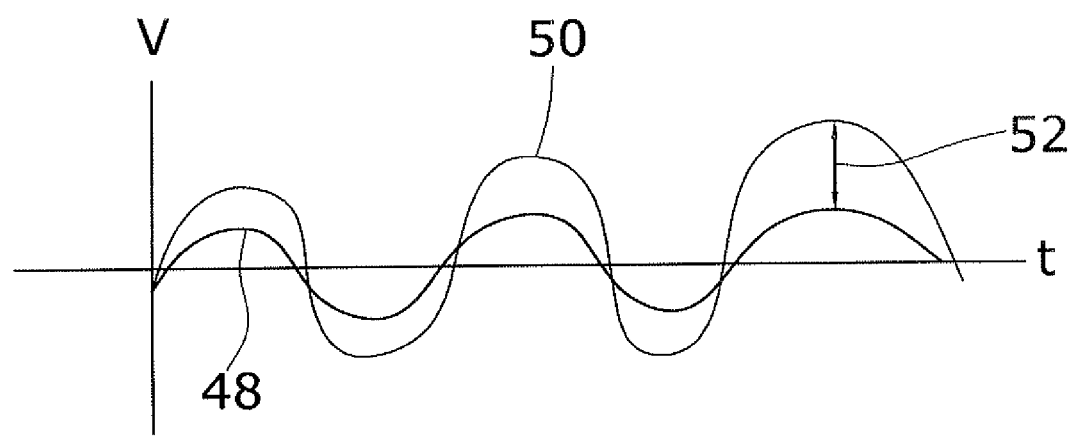
FIG. 12 is a graph showing, in two scenarios, fluctuation of potential difference over time across a right section (R) and a ground section (G) of the stylus of FIG. 11.

FIG. 11 is a schematic diagram showing one end 36 of the electrical cable 18 having a jack 38 provided with a left audio section 40, a right audio section 42, a ground section 44 and a mic section 46, each of these sections leads to a left wiring (L), a right wiring (R), a ground wiring (G) and a mic wiring (M). FIG. 11 shows a particular embodiment of the present invention in which the R, the signal modulator (SM) including the resistor and the G are connected in series, and thus with the RSM-G forming a circuit. It can thus be envisaged that, in response to change in resistance at the resistor 34 due to change of pressure exerted on the stylus 12, there is a change of voltage or potential difference in the R-SM-G circuit. (V=1R) FIG. 12 depicts exemplary fluctuations of the voltage in the R-SM-G circuit in two scenario. In a first scenario as represented by the bolded curve 48, no pressure is exerted on the stylus 12 and as such there is no change is resistance by the resistor 34. The voltage in the R-SM-G circuit can thus be illustrated, for example, by a sine wave. In a second scenario as represented by the un-bolded curve 50, varying pressure is exerted on the stylus 12 thus causing a change in resistance and voltage in the R-SM-G circuit. Depending on the magnitude of pressure exerted, the difference in voltage in a default pressure free stage and in a pressured stage can be substantial, as indicated by the arrows 52 in FIG. 12.

Figure 13A:
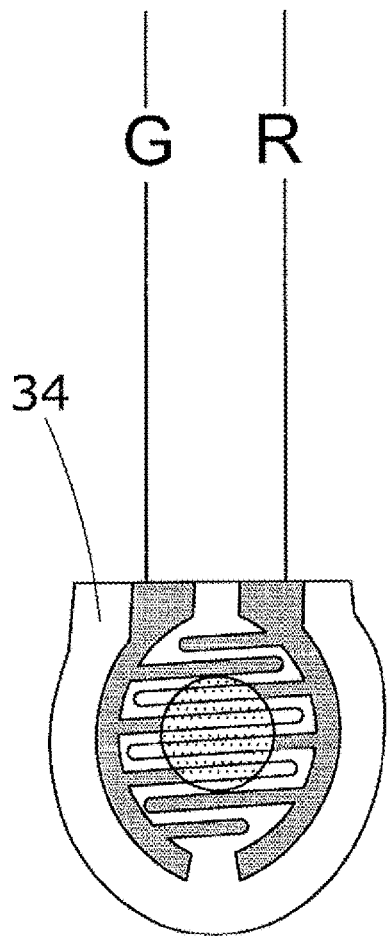
FIG. 13A is a schematic diagram of part of the electronics of FIG. 11.

FIG. 13A illustrates the R-SM-G circuit in an alternative presentation. In the default state, the voltage in the circuit constant.

Figure 13B:
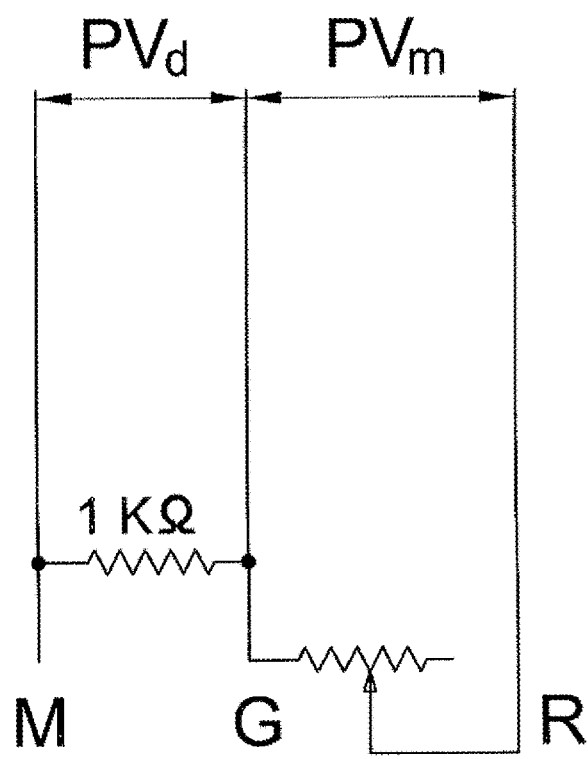
FIG. 13B is a circuit illustration of the electronics of FIG. 11.

FIG. 13B illustrates that in operation there are two potential differences, a first or modulated potential difference, namely $PV_m$, between R and G, and a second or default potential difference, namely, $PV_d$ between G and M.

Figure 14:
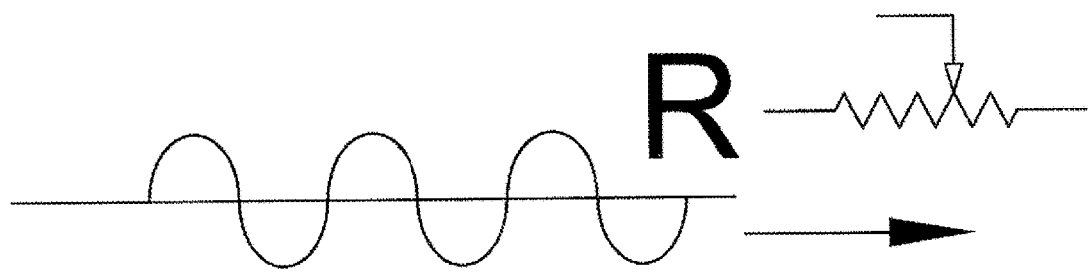
FIG. 14 is another circuit illustration of the electronics of FIG. 11.

FIG. 14 is a schematic diagram showing as the resistor 34 is not actuated on, there is no change in signal in the circuit. It is envisaged that if the resistor is actuated on, there is a change in signal in the circuit and the signal pattern would be different from the one shown in FIG. 14.

Figure 15A:
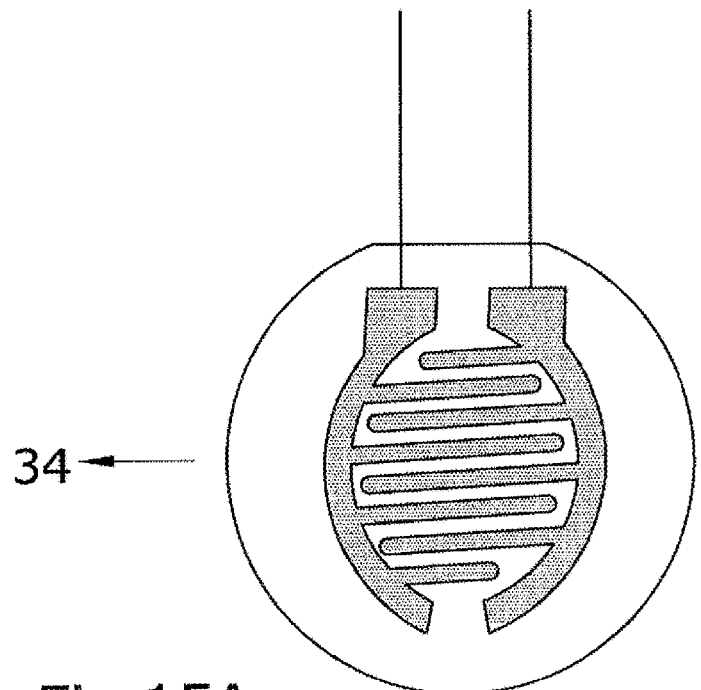
FIG. 15A is a schematic diagram showing one embodiment of a resistor for use in the present invention.

FIG. 15A is a schematic diagram showing the sine wave representing a state when pressure is not exerted on the stylus 12. FIG. 15A shows that the resistor 34 has two sets of fingers inter-digitally arranged.

Figure 15B:
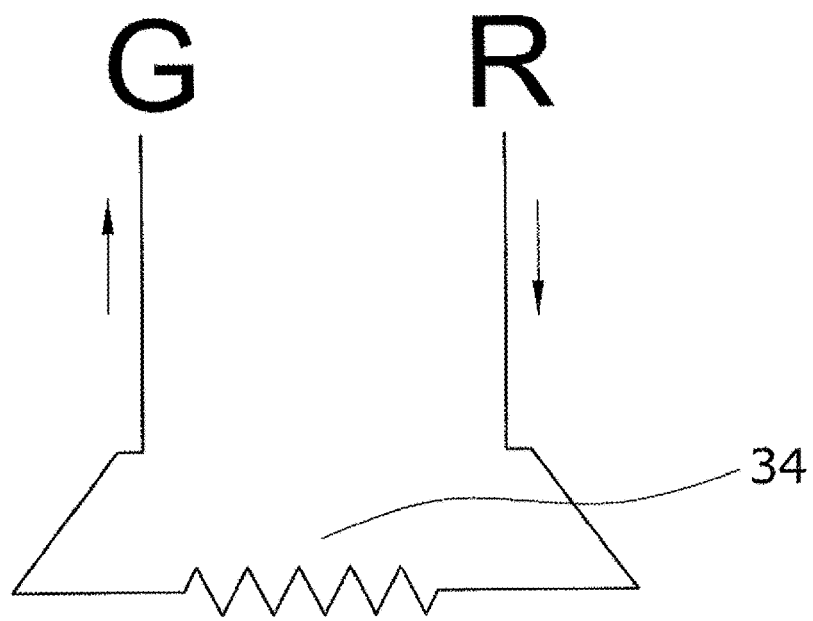
FIG. 15B is a schematic diagram illustrating that as resistance changes in the circuit voltage therein also changes.

It is to be noted that when pressure is exerted on the stylus 12, the resistor 34 changes the voltage in the R-SM-G circuit and the pattern of the wave would be changed. FIG. 15B is a schematic diagram illustrating that as resistance changes in the circuit voltage therein also changes.

Figure 16:
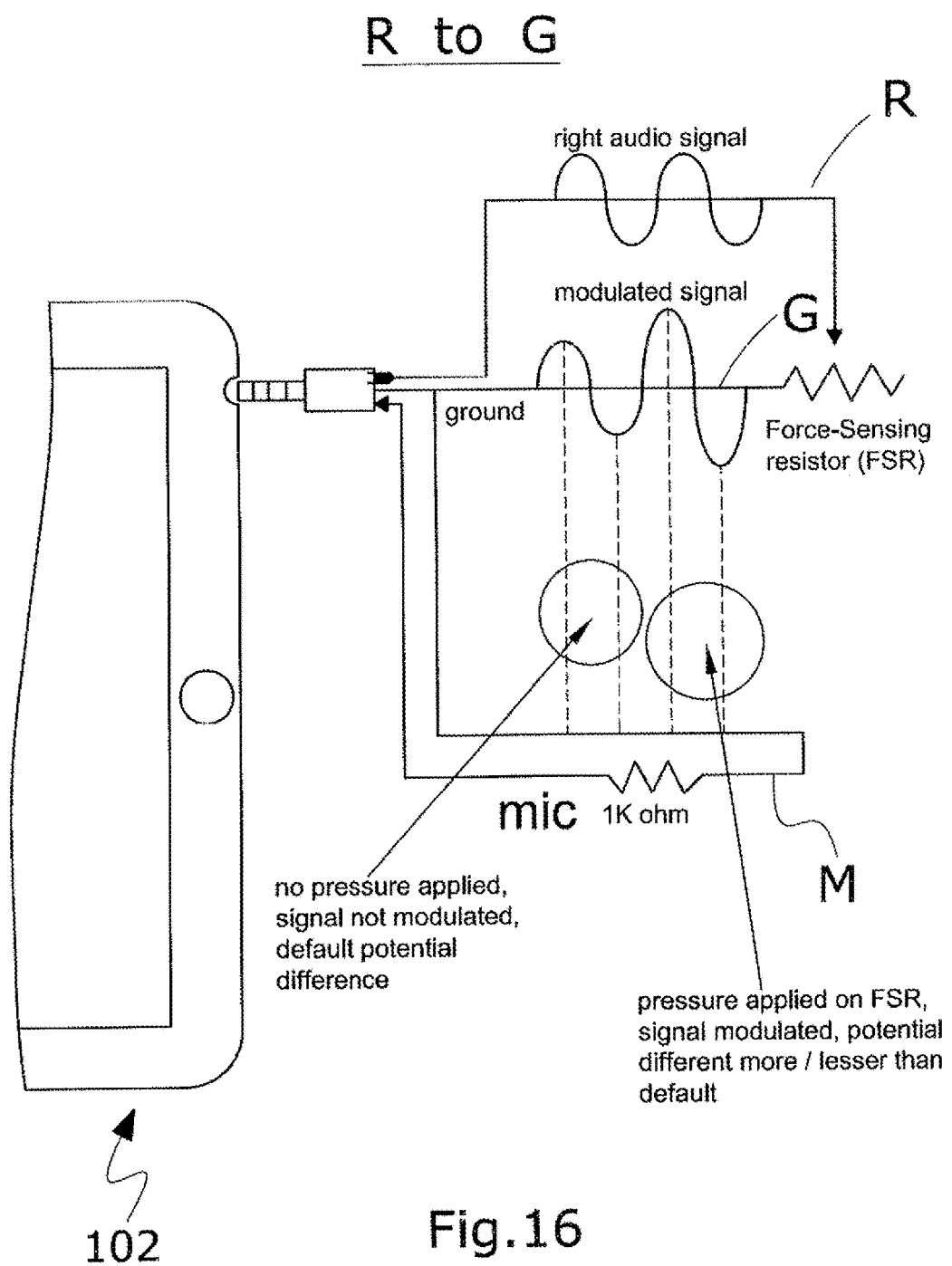
FIG. 16 is an embodiment of an input system according to the present invention.

FIG. 16 is a schematic diagram illustrating an embodiment of a combination of digital device 102 and stylus for use with the digital device 102 according to the present invention. Similar to the illustration in FIG. 11, right wiring of connecting cable from the stylus is connected to ground wiring R in that the right wiring R, force sensing resistor FSR and the ground wiring G are connected in series. The ground wiring G is connected to the mic wiring M. When no pressure is exerted on the stylus, signal incoming to the right wiring R and exiting the ground wiring G via the resistor FSR is not modulated and thus the differential of i) the potential difference between the right wiring R and the ground wiring G, and ii) the potential difference between the ground wiring G and the mic wiring M is substantially zero. In this state, computer program installed in the digital device on detection of this substantial nil differential does not register a line with an increased width being drawn. However, when the pressure is exerted on the stylus, signal incoming to the right wiring R and existing the ground wiring G via the resistor FSR is modulated and thus there is a differential of i) the potential difference between the right wiring R and the ground wiring G, and ii) the potential difference between the ground wiring G and the mic wiring M. In this alternative state, the computer program installed in the digital device 102 on detection of this differential registers the line with an increased width being drawn. The extent of increase in width corresponds to magnitude of the downward force exerted on the stylus. The two curves in FIG. 16 illustrates a time frame when there is substantially nil differential, and a subsequent time frame when there is a substantial differential.

Figure 17:
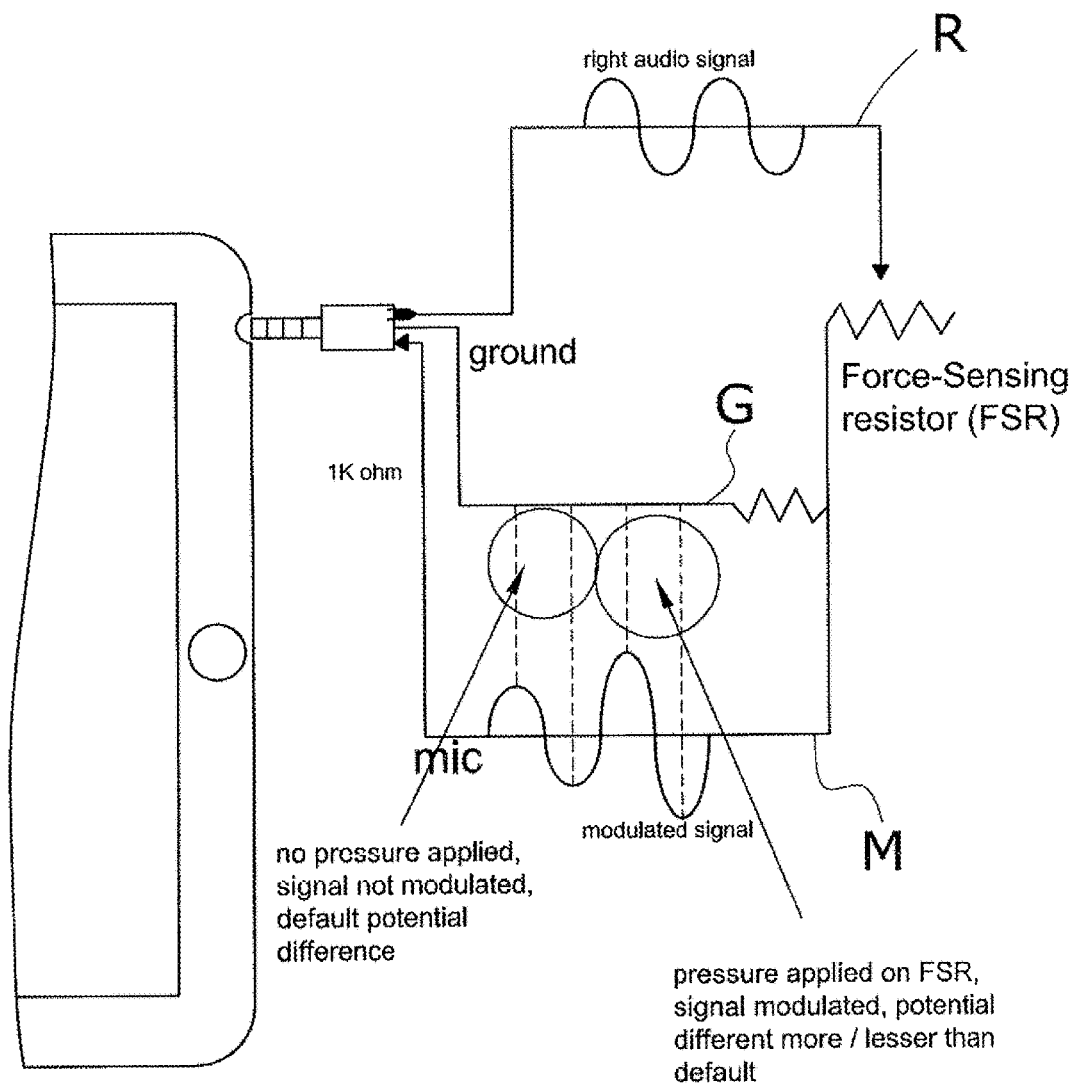
FIG. 17 is an alternative embodiment of an input system according to the present invention.

FIG. 17 is an alternative embodiment although connection of wirings is slightly different. In this embodiment, a right wiring R is connected to a mic wiring M via a signal modulator or a force sensing resistor FSR, while a ground wiring is connected to the mic wiring M. Two potential differences, namely i) a first potential difference between the right wiring R and the mic wiring M, and ii) a second potential difference between the ground wiring G and the mic wiring M, are similarly being detected. Depending on the down pressure exerted on the stylus and the pressure experienced by the resistor FSR, a differential of the two potential differences is generated, and this differential translates to adjustment of width of a line being displayed on a touchscreen interface in use.

Figure 18:
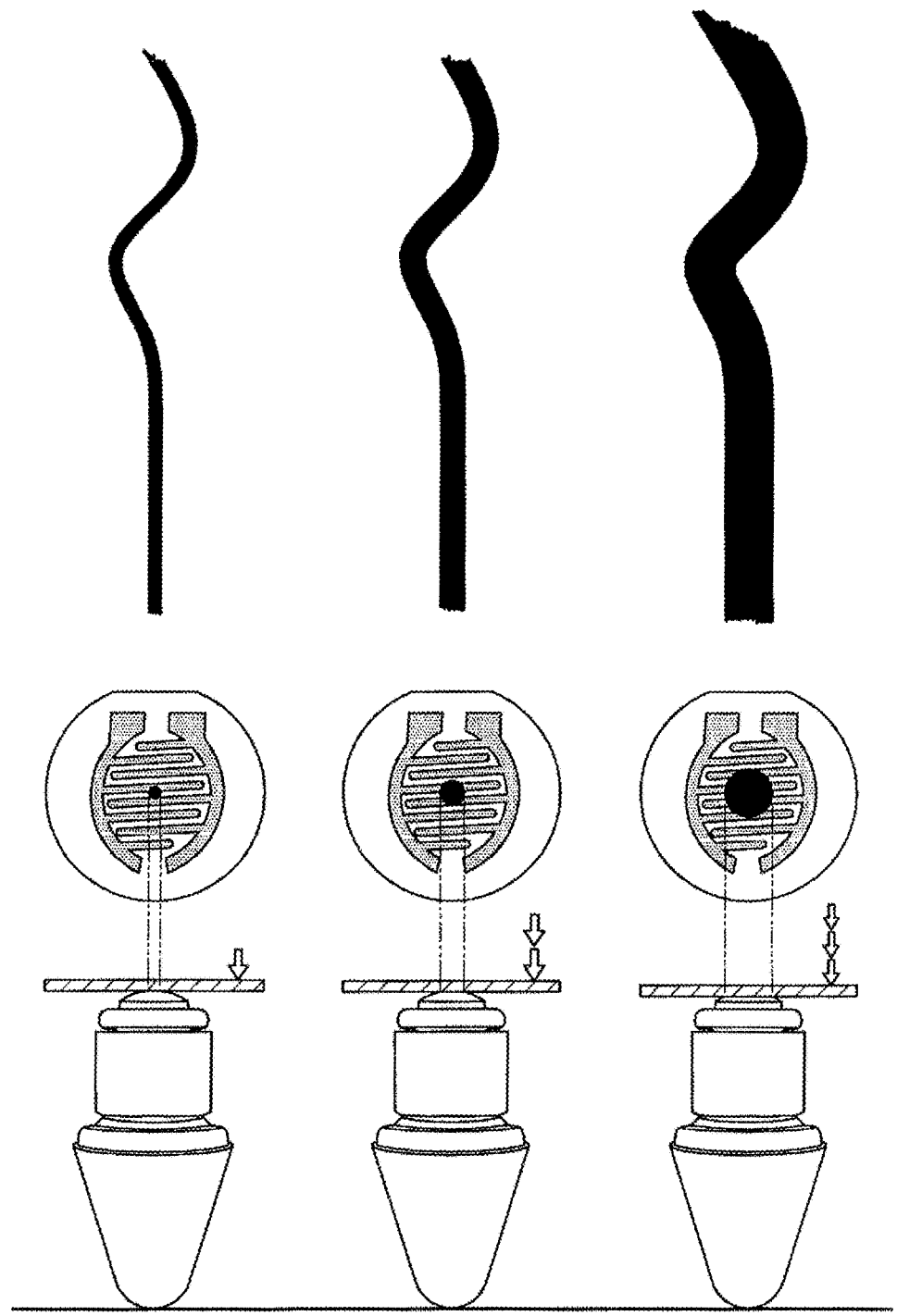
FIG. 18 is a schematic illustration showing operation of an embodiment of a stylus and writing effect of the stylus.

FIG. 18 is a schematic diagram which shows that depending on the magnitude of downward force exerted on the stylus during a writing exercise, a line in varying width can be drawn. The portion of FIG. 18 on the left shows that a lesser force is exerted on the stylus thus a thinner line or stroke is displayed, while the portion of FIG. 18 on the right shows a greater force exerted on the stylus thus a thicker line or stroke is displayed.

Figure 19:
FIG. 19 and FIG. 20 are illustrations showing different writing effects of the stylus of FIG. 18.
Figure 20:
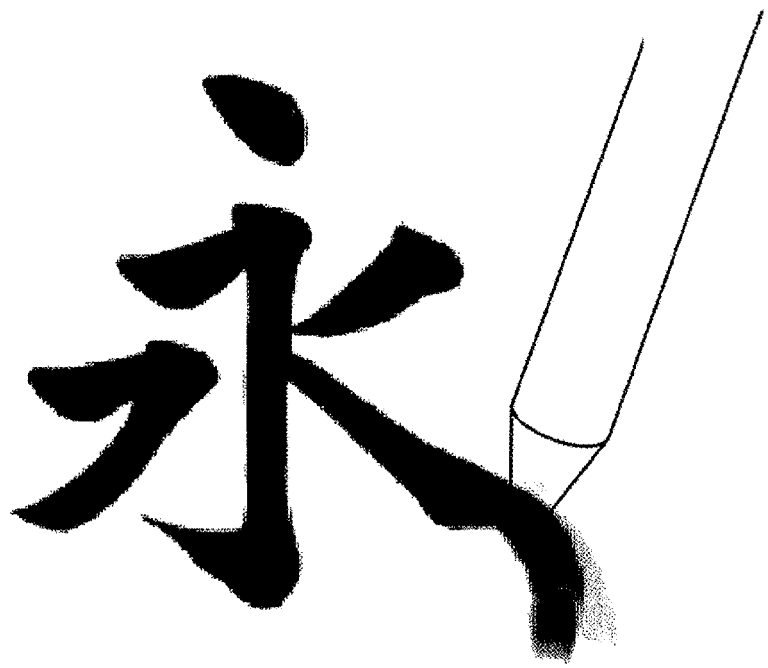

FIG. 19 is an image of a plurality of lines displayed by a touchscreen of an embodiment of a digital device and stylus system of the present invention. It is shown that with the use of the present invention, it is possible to effect draw a continuous line on the touchscreen with varying thickness without having to change writing mode during the course of the drawing or writing. FIG. 20 shows that with the use of such systems, writing calligraphy (character-based or alphabet-based) is not only possible, but also similar to one drawing or writing on paper.

Figure 21:
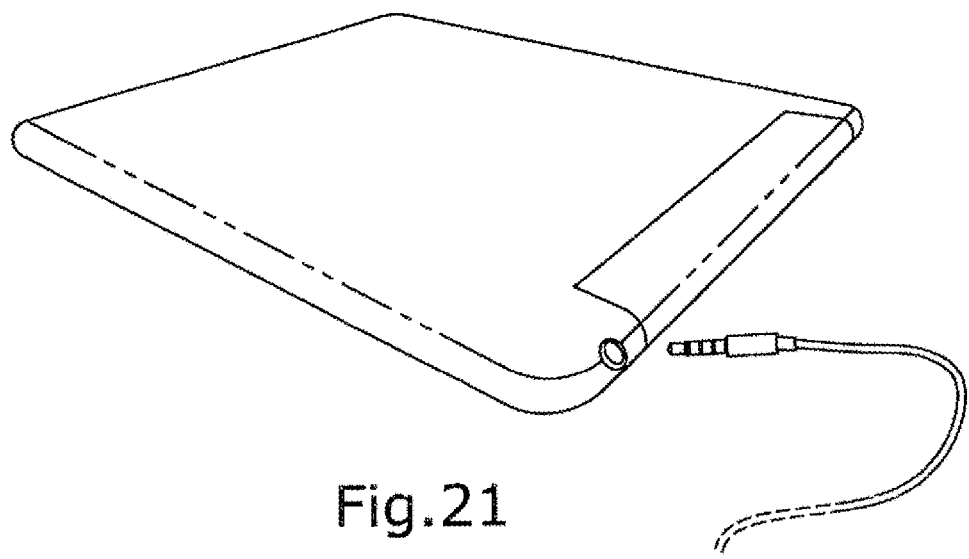
FIG. 21 and FIG. 22 show different views of another embodiment of an input system according to the present invention.
Figure 22:
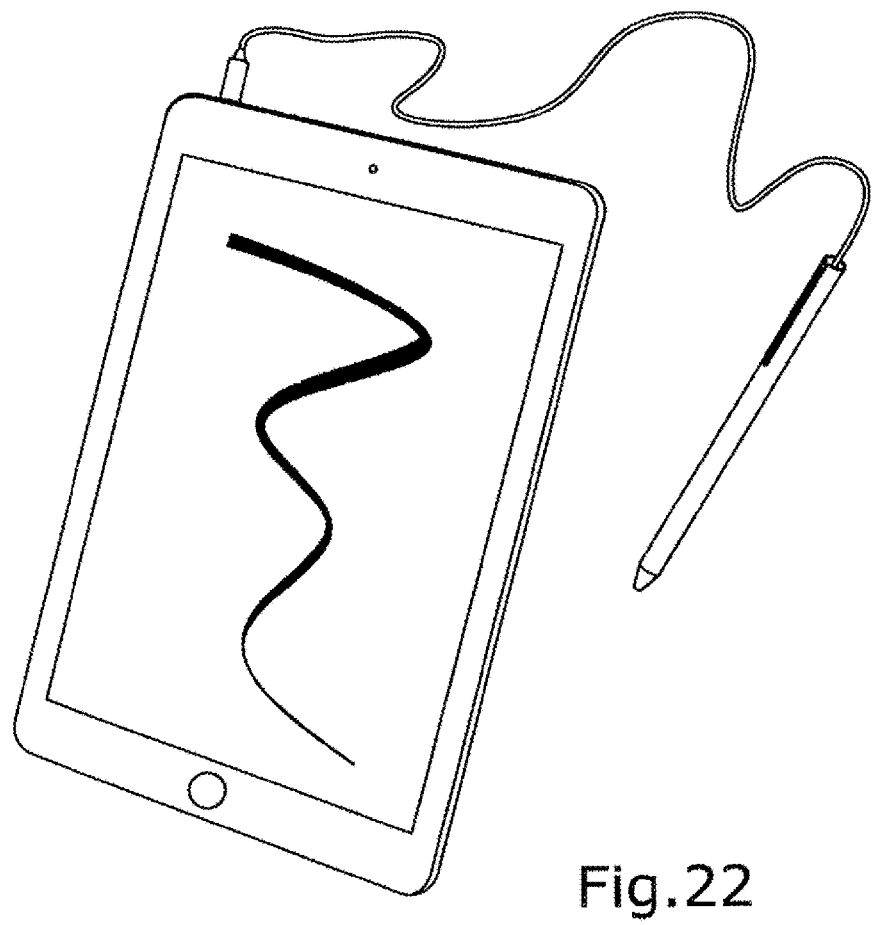

FIG. 20 and FIG. 21 show an embodiment of a combination of digital device and stylus according to the present invention. The digital device is a tablet. The stylus is connected to the tablet via a physical cable. FIG. 21 illustrates how the combination of digital device and stylus operated during use. Among other advantages, the physical connection of the tablet and the stylus minimizes the chance that the stylus would be detached and go missing. It is also to be noted that the stylus communicates with, for example, the tablet with a physical connection cable. There is free of wireless transmission means in the stylus. This is advantageous because there is minimal electronics in the stylus which provides of design freedom making the stylus.

While a bulk of the above description of embodiments of the present invention refers to effecting a stroke or drawing a line on a touchscreen of a tablet, the present invention can equally apply to effecting other forms of registration on a touchscreen of a computing device. For example, instead of drawing a line with varying width, the present invention can also be applied in an alternative embodiment in the context of a football video game loaded in a computing device having a touchscreen. In such embodiment, the stylus when pressed against the touchscreen, a user can choose to kick the football to a desired distance away by controlling the force that s/he exerts on the touchscreen via the stylus. In other words, the user can cause the football to travel to a desired direction and for a desired distance in one movement, i.e. selection of registration, of the stylus by controlling the magnitude of downward force and movement direction of the stylus.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. Also, a skilled person in the art will be aware of the prior art which is not explained in the above for brevity purpose.

The invention claimed is:

1. An electronic stylus comprising an elongate member with a utility portion for effecting input on or otherwise contacting a touchscreen of a handheld computing device and a handle portion adapted to fit the grip of a user in use, and a cable for electrically connecting the handheld computing device and the elongate member, said cable adapted to transmit a first signal from the handheld computing device to said stylus and then to transmit a second signal from said stylus to the handheld computing device via said cable, the second signal modulated from the first signal and not generated from within said stylus; wherein said utility portion includes a signal modulator for modulating the first signal to the second signal; and wherein:
  a) said cable is provided with a jack for connection to an audio input/output port of the handheld computing device;
  b) said utility portion of said stylus is adapted to effect a stroke with varying width along a length of the stroke or registration on the touchscreen, the width of the stroke at a particular longitudinal location of the stroke or a selection of the registration, partly due to a downward pressure experienced by a force sensing resistor in said stylus, corresponds with magnitude of downward pressure exerted by the user on the touchscreen via said utility portion;
  c) said stylus is free of means for said stylus to wirelessly communicate with the handheld computing device;
  d) said cable is adapted, in a first instance, to transmit the first signal across a member in the cable with a default voltage, then, in a second instance, transmit the second signal across the member with a voltage modulated from the default voltage, difference of the modulated voltage and the default voltage corresponds with the magnitude of downward pressure; and
  e) said utility portion includes a floating member for engagement with the touchscreen.

2. An electronic stylus as claimed in claim 1, comprising a modulator configured to, in response to change in pressure exerted thereon, modulate resistance thereof, and then in turn modulate electrical current passing therethrough.

3. An electronic stylus as claimed in claim 2, wherein said modulator is a force-sensing resistor.

4. An electronic stylus as claimed in claim 3, wherein said force-sensing resistor has two sets of fingers inter-digitally arranged.

5. An electronic stylus as claimed in claim 4, wherein said jack of the cable has a mic section, a ground section, a left audio section and a right audio section.

6. An electronic stylus as claimed in claim 5, wherein said jack is connected to a first contact pin and a second contact pin.

7. An electronic stylus as claimed in claim 6, wherein said utility portion is configured such that said right audio section or left audio section of said connector is electrically connectable to the audio input/output port of the computing device at one end and connected with said first contact pin at an opposite end, and wherein said second pin is electrically connected to said ground section.

8. An electronic stylus as claimed in claim 7, wherein said audio right or left section, said first contact pin, said resistor, said second pin and said ground section are arranged in series.

9. An electronic stylus as claimed in claim 8, wherein, in operation, said utility portion is adapted to assume a first configuration or a second configuration, in which in the first configuration no pressure is exerted on said floating member and potential difference between said ground section and said mic section is not changed, whereby the second signal is not modulated or is otherwise identical to the first signal.

10. An electronic stylus as claimed in claim 9, wherein, in the second configuration in which pressure is exerted on said floating member and potential difference between said ground section and said mic section is changed, whereby the second signal is modulated from the first signal, and wherein change in the width of the stroke effected corresponds to the magnitude of downward pressure exerted by the user on the touchscreen via said utility portion.

11. An electronic stylus as claimed in claim 6, wherein said utility portion is configured such that said right audio section or left audio section of said connector is electrically connectable to the audio input/output port of the computing device at one end and connected with said first contact pin at an opposite end, and wherein said second pin is electrically connected to said mic section.

12. An electronic stylus as claimed in claim 11, wherein said audio right or left section, said first contact pin, said resistor, said second pin and said mic section are arranged in series.

13. An electronic stylus as claimed in claim 12, wherein, in operation, said utility portion is adapted to assume a first configuration or a second configuration, in which in the first configuration no pressure is exerted on said floating member and potential difference between said ground section and said mic section is not changed, whereby the second signal is not modulated or is otherwise identical to the first signal.

14. An electronic stylus as claimed in claim 13, wherein, in the second configuration in which pressure is exerted on said floating member and potential difference between said ground section and said mic section is changed, whereby the second signal is modulated from the first signal, and wherein change in the width of the stroke effected corresponds to the magnitude of downward pressure exerted by the user on the touchscreen via said utility portion.

15. An electronic stylus comprising an elongate member with a utility portion for effecting input on or otherwise contacting a touchscreen of a handheld computing device and a handle portion adapted to fit the grip of a user in use, and a cable for electrically connecting the handheld computing device and the elongate member, said cable adapted to transmit a first signal from the handheld computing device to said stylus and then to transmit a second signal from said stylus to the handheld computing device via said cable, the second signal modulated from the first signal and not generated from within said stylus; wherein said utility portion includes a signal modulator for modulating the first signal to the second signal; and wherein:
   a) said cable is provided with a jack for connection to an audio input/output port of the handheld computing device;
   b) said utility portion of said stylus is adapted to effect a stroke with varying width along a length of the stroke or a registration on the touchscreen, the width of the stroke at a particular longitudinal location of the stroke or a selection of the registration, partly due to a downward pressure experienced by a force sensing resistor in said stylus, corresponds with magnitude of downward pressure exerted by the user on the touchscreen via said utility portion;
   c) said cable is adapted, in a first instance, to transmit the first signal across a member in the cable with a default voltage, then, in a second instance, transmit the second signal across the member with a voltage modulated from the default voltage, difference of the modulated voltage and the default voltage corresponds with the magnitude of downward pressure; and
   d) said utility portion includes a floating member for engagement with the touchscreen.

16. A combination of a handheld electronic device with a touchscreen and an electronic stylus, the electronic stylus including an elongate member with a utility portion for effecting input on or otherwise contacting said touchscreen and a handle portion adapted to fit the grip of a user in use, and a cable for electrically connecting to the handheld electronic device and the elongate member, said cable adapted to transmit a first signal from said handheld electronic device to said stylus and then to transmit a second signal from said stylus to said handheld electronic device via said cable, the second signal modulated from the first signal and not generated from within said stylus; wherein said utility portion includes a signal modulator for modulating the first signal to the second signal; and wherein:
   a) said cable is provided with a jack for connection to a conventional audio input/output port of said handheld electronic device;
   b) said utility portion of said stylus is capable to effect a stroke with varying width along a length of the stroke or a registration on the touchscreen, the width of the stroke at a particular longitudinal location of the stroke or a selection of the registration, partly due to a downward pressure experienced by a force sensing resistor in said stylus, corresponds with magnitude of downward pressure exerted by the user on the touchscreen via said utility portion;
   c) said stylus is free of means for said stylus to wirelessly communicate with the computing device;
   d) said cable is adapted, in a first instance, to transmit the first signal across a member in the cable with a default voltage, then, in a second instance, transmit the second signal across the member with a voltage modulated from the default voltage, difference of the modulated voltage and the default voltage corresponds with the magnitude of downward pressure; and
   e) said utility portion includes a floating member for engagement with the touchscreen.

17. An input system comprising a handheld electronic device with a touchscreen, an electronic stylus, and a computer program stored on a non-transitory computer readable medium in the handheld electronic device that is executed by a processor of the electronic device, wherein:

a) the stylus includes an elongate member with a utility portion for effecting input on or otherwise contacting the touchscreen and a handle portion adapted to fit the grip of a user in use, and a cable for electrically connecting to the handheld electronic device and the elongate member, the cable adapted to transmit a first signal from the handheld electronic device to the stylus and then to transmit a second signal from the stylus to the handheld electronic device via the cable, the second signal modulated from the first signal and not generated from within the stylus;

b) the cable is provided with a jack for connection to an audio input/output port of the handheld electronic device;

c) the utility portion of the stylus is capable to effect a stroke with varying width along a length of the stroke or a registration on the touchscreen, the width of the stroke at a particular longitudinal location of the stroke or the selection, partly due to a downward pressure experienced by a force sensing resistor in said stylus, corresponds with magnitude of downward pressure exerted by the user on the touchscreen via the utility portion;

d) the stylus is free of means for the stylus to wirelessly communicate with the computing device; and e) the computer program is configured to produce a value corresponding to a differential of i) a detected potential difference between a right or left audio section and a ground or mic section of the cable and ii) a potential difference between ground and mic sections of the cable, whereby the computing device in response to the differential value produces a stroke with a width or a selection in commensuration with the differential value.

* * * * *